United States Patent [19]

Grace

[11] Patent Number: 4,498,361
[45] Date of Patent: Feb. 12, 1985

[54] BROACH MANUFACTURING METHOD
[75] Inventor: Wallace C. Grace, LaSalle, Canada
[73] Assignee: Ex-Cell-O Corporation, Troy, Mich.
[21] Appl. No.: 488,233
[22] Filed: Apr. 25, 1983
[51] Int. Cl.³ .............................................. B21K 5/02
[52] U.S. Cl. .............................. 76/101 R; 51/281 R
[58] Field of Search ........................ 76/101 R, 104 R; 407/13, 16, 18

[56] References Cited
U.S. PATENT DOCUMENTS
4,272,927 6/1981 Myers et al. ...................... 76/101 R Primary Examiner—Roscoe V. Parker
Attorney, Agent, or Firm—Edward J. Timmer

[57] ABSTRACT

The broach manufacturing method includes a first turning operation in which the outer diameter of the puller portion, retriever portion and the toothed cutting portion are rough turned to within 0.030–0.050 inch of finished dimension. Also, in the first turning opertion, the cutting teeth are turned to include a gullet radius of finished dimension and an oversized hook angle intersecting therewith. Following a hardening treatment, the cutting teeth are turned to finished dimension in a second turning operation with the exception that the outer diameter and back-off angle of the finishing teeth are turned slightly oversize in the second turning operation followed by grinding to final dimension. The oversized hook angle of the cutting teeth is also nicked off during the second turning operation and blended with the gullet radius turned in the first turning operation. The turning operations are performed on a CNC lathe.

6 Claims, 7 Drawing Figures

BROACH MANUFACTURING METHOD

FIELD OF THE INVENTION

The present invention relates to broaching tools and, in particular, to improved methods for their manufacture.

BACKGROUND OF THE INVENTION

The methods employed in manufacturing broaching tools have remained relatively static over the past forty years or so.

In one manufacturing method, the broach is produced from high steel bar stock by first turning the bar in the soft condition (annealed condition) in a manual lathe operation to form the puller portion adjacent one end of the bar, the retriever portion adjacent the other end and the toothed cutting portion, including a roughing section, semi-finishing section and finishing section, intermediate the puller and retriever portions. Each cutting section includes sequentially arranged cutting teeth having a uniform cutting edge and predetermined increase in tooth size along the length of the cutting portion. In the manual lathe operation, the puller portion, retriever portion and toothed cutting portion are machined to within 0.30-0.050 inch of finished dimension. The so-called gullet radius and hook angle of the cutting teeth are turned in true relation with each other in the manual lathe operation.

Thereafter, the rough turned broaching tool is heat treated to a hardness of $R_c$ 65 and the cutting edges of the teeth are brought up sharp from the gullet radius manually using a broach sharpening machine designed specifically for this purpose. Then, the external diameters of the broaching tool are brought to finish size by an O.D. grinding operation. The total manufacturing time for a typical round broach employing these steps has been on the order of 8-9 hours and is very manual labor intensive.

SUMMARY OF THE INVENTION

It is an object of the present invention to provide an improved broach manufacturing method in which a turning operation is employed prior to heat treating (the soft turn) which rough machines the outer diameters of the puller portion, retriever portion and cutting portion preferably to within 0.030-0.050 inch of finished dimension with the cutting teeth having a finish size gullet radius and an oversized hook angle intersecting the gullet radius.

It is another object of the invention to provide such a broach manufacturing method in which a second turning operation (the hard turn) is employed subsequent to heat treating. This operation finish turns the cutting tooth profile, which includes the outer diameters, the back-off angle for tooth clearance and facing the hook angle, to finish dimension. The outer diameter and back-off angle of the finishing teeth may be turned slightly oversize in this operation followed by grinding to final dimension.

It is still another object of the invention to provide such a broach manufacturing method in which the soft turn operation and the hard turn operation are effected by a computer controlled turning machine.

In a typical working embodiment for making a round broach, the broach bar stock is turned to rough machine the outer diameter of the puller and retriever portion and the cutting portion preferably to within 0.030-0.050 inch of finished dimension. Importantly, the teeth are turned to have a finished gullet cavity with the gullet radius of this cavity intersecting with an oversized hook angle (e.g., 18° compared to finished hook angle of 12°). Following standard heat treatment of the soft turned bar stock, a second turning operation is conducted in which the bar stock in the hard (heat treated) condition is turned to machine the cutting portion to reduce the tooth outer diameters and back-off angle of the roughing section and semi-finishing section to finish size and the outer diameter and back-off angle of the finishing section to slightly oversize and then to nick off the hook angle "oversize" to form the finished hook angle blending with the previously soft turned gullet radius.

After the hard turning operation, external diameters and back-off angles of the teeth in the finishing section may be subjected to a grinding operation to provide the close tolerances normally required in this section of the cutting portion.

DESCRIPTION OF PREFERRED EMBODIMENTS

Figure 1:
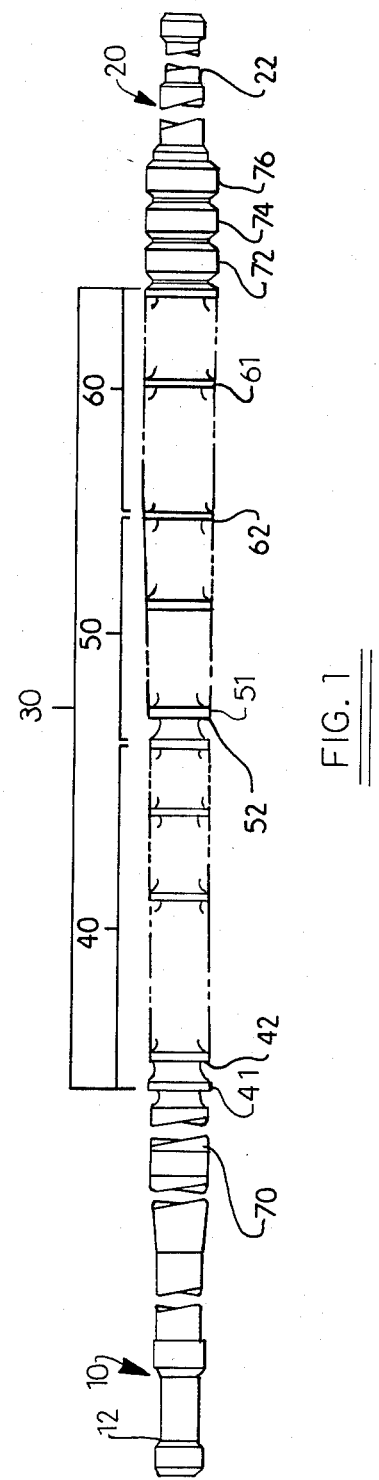
FIG. 1 is an elevation of a round broaching tool manufactureable by the method of the invention.
Figure 2:
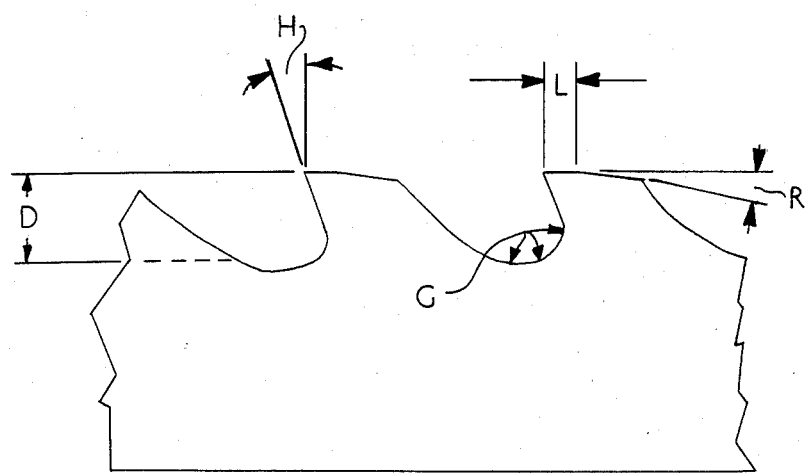
FIG. 2 is a partial elevation of typical teeth in cutting portion 30 of the tool of FIG. 1.

FIGS. 1 and 2 illustrate a typical round broaching tool manufactured in accordance with the present inventive method. Of course, other types of broaching tools including spline, square and hexagonal broaches are amenable to manufacture by the inventive method.

In particular, it will be apparent that the typical finished broaching tool comprises a puller portion 10 adjacent one end, a retriever portion 20 adjacent the other opposite end and a cutting portion 30 between the portions 10 and 20. The cutting portion 30 may include three cutting sections such as a roughing section 40, a semi-finishing section 50 and a finishing section 60. Each cutting section 40, 50 includes sequentially arranged teeth 41, 51 which have a uniform cutting edge 42, 52 and which teeth have a pre-calculated rise (or increase in diameter) from one tooth or group of teeth to the next toward the finish section (60) of the broaching tool as shown. Finishing section 60 includes cutting teeth 61 of constant outer cutting diameter from one tooth to the next and having a uniform cutting edge 62.

Each tooth in the cutting sections 40, 50, 60 has a profile or cross-section shown in FIG. 2 including an outer diameter described by a straight land L and a rake or backoff angle "R" providing clearance between the rear of the tooth and workpart. A tooth depth "D" determines chip capacity. Each tooth is characterized also by a hook or face angle "H" which may vary from 0° to 20°, depending on the workpiece material being cut, and a gullet or root radius "G" blending with the hook angle "H" to provide a surface to initiate and maintain rolling of the machining chip.

Manufacture of a round broaching tool (commonly used for enlarging a circular hole in a workpiece) begins with annealed (soft) high speed steel bar stock cut to appropriate length and centered. An optional grinding operation of the outer diameter (O.D.) may be required for bar stock with severe runout.

Figure 7:
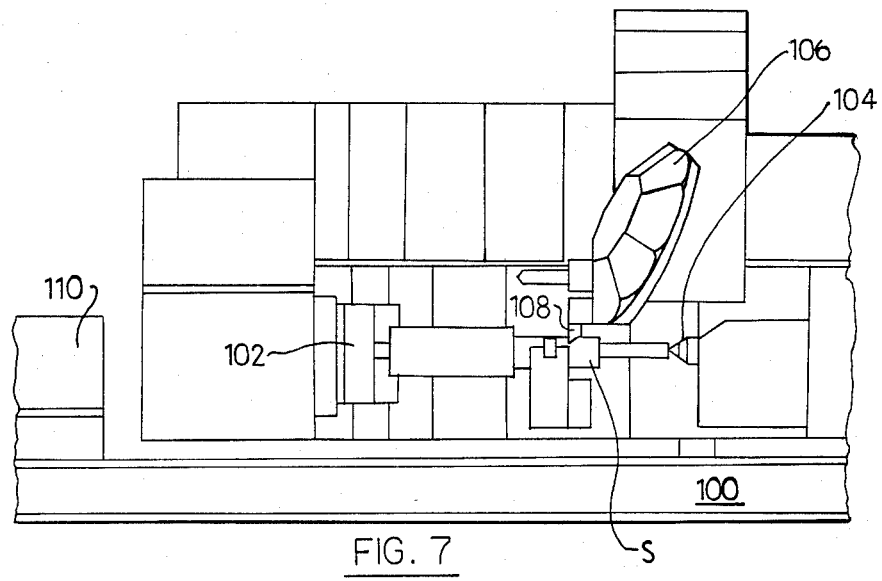
FIG. 7 is a front elevation of the CNC lathe used in the broach manufacturing process.

The bar stock is chucked in a computer controlled turning machine, in particular a CNC lathe model Index GU 3000 manufactured by Index Verkaufs GmbH. The turning machine is programmed to perform a soft turning operation on the bar stock in the annealed condition and a "hard" treatment turning operation on the bar stock after heat treatment which raises the hardness of the bar stock to $R_c = 64-66$. The CNC lathe is shown schematically in FIG. 7 and includes a machine bed 100, a rotatable spindle chuck 102 and a tailstock 104 with the bar stock held between the spindle and tailstock for rotation. The machine includes an indexable tool platform 106 carrying various cutting inserts, for example insert 108. A CNC system 110 controls insert movement in the desired sequence.

Figure 3:
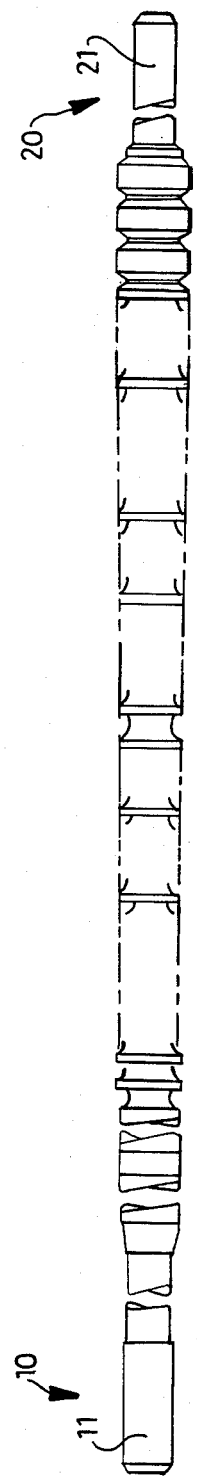
FIG. 3 is an elevation of turned bar stock resulting from the soft turning operation of the inventive method.

In the first turning operation, the bar stock is machined to a so-called turning drawing shown in fragmentary fashion in FIG. 3. In particular, the puller portion 10 and retriever portion 20 are machined to have the features shown within 0.030-0.050 inch of finished dimension. It is apparent that the ends of each of the puller portion and retriever portion are O.D. machined to provide only cylindrical ends 11, 21, respectively. During the first turning operation, the teeth in the cutting sections 40, 50, 60 are machined with a gullet radius G to finished dimension and a hook angle H which is oversized relative to finish dimension; (e.g., 18° instead of the finish hook angle of 12°.) The O.D. (outer diameter) of the teeth of sections 40, 50, 60 are turned 0.030-0.050 inch oversize relative to finish dimension. Also, the O.D.'s of pilot sections 70, 72, 74 and 76 are turned to finished dimension.

During the first turning operation, the cutting insert of the turning machine traverses the bar stock from the puller portion 10 toward the retriever portion 20, the insert path being controlled by the CNC system of the machine. The insert used is made of tungsten carbide which is available commercially.

Following the first turning operation, the bar stock is heat treated in conventional fashion, to raise the hardness to $R_c = 64-66$. The heat treated (hard) bar stock is then O.D. ground merely to provide steady rest spots for maintaining concentricity over long lengths.

Figure 4:
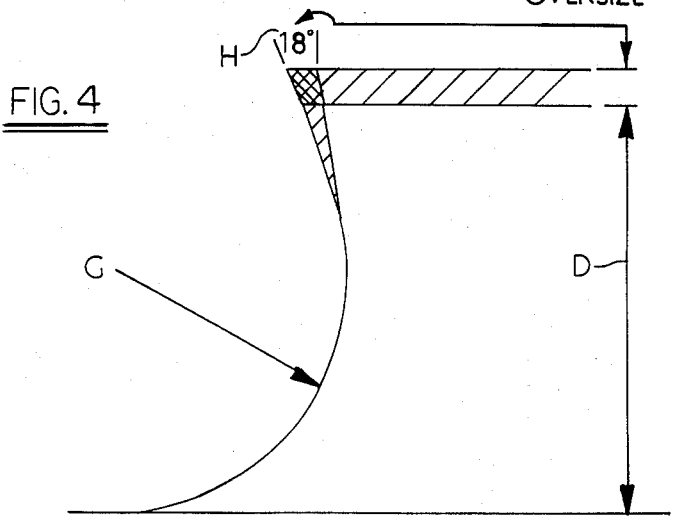
FIG. 4 is a partial enlarged elevation of a typical tooth in the cutting portion after the soft turn operation.
Figure 5:
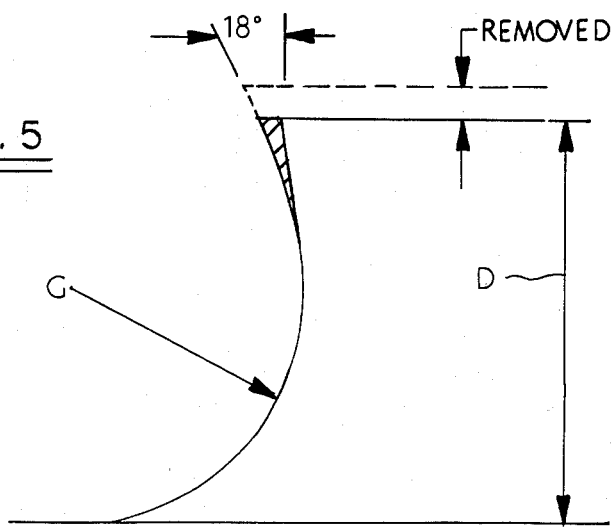
FIG. 5 is similar to FIG. 5 but after the O.D. has been turned to finished dimension in the hard turn operation.
Figure 6:
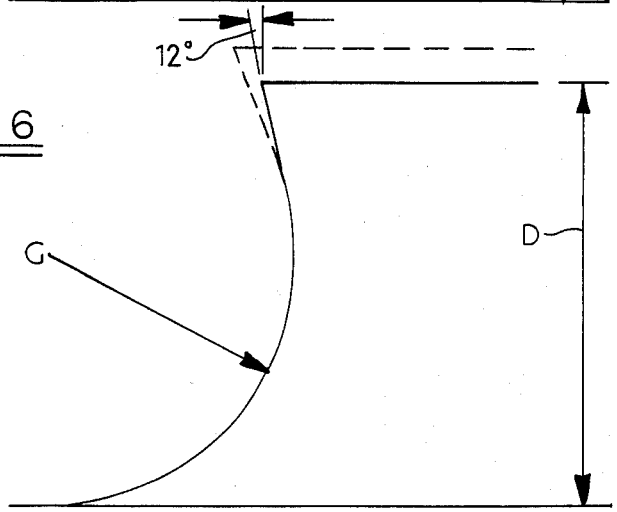
FIG. 6 is similar to FIGS. 5 and 6 but after the hook angle has been nicked off and blended with the gullet radius in the hard turn operation.

The second turning operation is performed on the CNC lathe to produce a broach to a so-called finished drawing, FIG. 1, depicting the final or finished product. In particular, the heat treated bar stock is turned on the machine to form circumferential notches 12 and 22 on the ends of the puller portion 10 and retriever portion 20, respectively, to finished dimension and to machine the O.D. of these same portions to finished dimension as well. Similarly, the O.D. and back-off angle angle R of the teeth of cutting sections 40 and 50 are turned to finish dimension while the O.D. and back-off angle of the teeth of cutting section 60 are turned slightly oversize by for example 0.0001-0.0005 inch. As shown most clearly in FIGS. 4 through 6, soft turning of the tooth O.D. (FIG. 4) leaves an oversized hook angle of 18° (FIG. 5) which is then nicked off and blended with gullet radius G (FIG. 6) during the hard turn operation to produce the finished 12° hook angle on all teeth of sections 40, 50, 60 and thus the proper tooth pitch profile. During the hard turn operation, a cubic boron nitride insert traverses from the puller portion 10 toward the retriever portion 20 as guided by the CNC system on the turning machine. The sequence of cutting on each tooth occurs such that the O.D. and back-off angle are machined first and then the oversized hook angle is nicked off and blended with the gullet radius G.

After the hard turning operation, the teeth of the finishing section 60 are ground to have final outer diameter and back-off angle tolerance and dimension, although it is within the scope of the invention to machine the teeth of finishing section 60 to finished dimension in the second turning operation.

To manufacture a round broaching tool of the type shown in FIG. 1 required about 1.9 hours in accordance with the inventive method whereas the same broach manufactured by the process described in the Background of the Invention section of this application required about 8.7 hours.

After the final hard turning operation and O.D. grinding of the teeth of the finishing section 60, only the minor operations of chip breaking and/or grinding of locating flats are required. These final operations would be similarly applied on broaching tools regardless of the manufacturing method used.

While the invention has been described by a detailed description of certain specific and preferred embodiments, it is understood that various modifications and changes can be made in them within the scope of the appended claims which are intended to also include equivalents of such embodiments.

I claim:

1. A method for making from tool stock a broaching tool with a puller portion adjacent one end, a retriever portion adjacent the other end and a cutting portion having a plurality of individual cutting teeth between the puller portion and retriever portion comprising
    (a) turning the tool stock to machine the outer dimension of the puller portion, retriever portion and cutting portion to a preselected over-size dimension larger than the finished outer dimension of the tool and turning individual cutting teeth to have a gullet radius to finished dimension and a hook angle to an oversize dimension intersecting the gullet radius,
    (b) then heat treating the tool stock turned in step (a),
    (c) then turning the heat treated tool stock to machine the oversize outer dimension of the puller portion, retriever portion and at least a portion of the cutting portion of the tool stock to finished dimension and turning individual cutting teeth to face the hook angle to finished dimension and blend said hook angle with the gullet radius.

2. The method of claim 1 wherein the outer dimension is machined in step (a) to within 0.030-0.050 inch of the finished outer dimension.

3. The method of claim 1 wherein in step (c) the outer dimension of the portion of the cutting portion is first turned to finished dimension and then the hook angle of individual cutting teeth is faced to finished dimension and blended with the gullet radius.

4. The method of claim 1 wherein the cutting portion includes roughing teeth, semi-finishing teeth and finishing teeth and wherein in step (c) the outer dimension of the roughing teeth and semi-finishing teeth is turned to finished dimension and the outer dimension of the finishing teeth is turned slightly oversize.

5. The method of claim 4 wherein the finishing teeth are ground to finished outer dimension following step (c).

6. The method of claim 4 wherein the outer dimension of the roughing teeth and semi-finishing teeth includes a straight land and an intersecting back-off angle turned to finished dimension in step (c).

* * * * *